United States Patent
Pathare et al.

(10) Patent No.: US 11,160,274 B1
(45) Date of Patent: Nov. 2, 2021

(54) ANTI-ALGAL AGENT

(71) Applicant: MELZER CHEMICALS PVT. LTD., Pune (IN)

(72) Inventors: Prakash Pathare, Pune (IN); Sheeba Swaminathan, Pune (IN); Rajesh More, Pune (IN)

(73) Assignee: MELZER CHEMICALS PVT. LTD., Pune (IN)

( * ) Notice: Subject to any disclaimer, the term of this patent is extended or adjusted under 35 U.S.C. 154(b) by 336 days.

(21) Appl. No.: 16/488,287

(22) PCT Filed: Jul. 26, 2019

(86) PCT No.: PCT/IN2019/050550
§ 371 (c)(1),
(2) Date: Aug. 23, 2019

(87) PCT Pub. No.: WO2020/031198
PCT Pub. Date: Feb. 13, 2020

(30) Foreign Application Priority Data

Aug. 10, 2018 (IN) .............................. 201821030232

(51) Int. Cl.
*A01N 25/08* (2006.01)
*A01N 47/12* (2006.01)
*A01N 43/80* (2006.01)
*A01N 47/40* (2006.01)
*A01N 33/20* (2006.01)

(52) U.S. Cl.
CPC ............. *A01N 25/08* (2013.01); *A01N 33/20* (2013.01); *A01N 43/80* (2013.01); *A01N 47/12* (2013.01); *A01N 47/40* (2013.01)

(58) Field of Classification Search
CPC ........ A01N 25/08; A01N 47/12; A01N 43/80; A01N 47/40; A01N 33/20
See application file for complete search history.

(56) References Cited

U.S. PATENT DOCUMENTS 7,888,514 B2   2/2011   Lindner

OTHER PUBLICATIONS

Cao et al., "Cellulose Hydrolysis Using Zinc Chloride as a Solvent and Catalyst," Applied Biochemistry and Biotechnology, Mar. 1994, pp. 521-530, vol. 45, Issue 1.
Rufford et al., "Microstructure and electrochemical double-layer capacitance of carbon electrodes prepared by zinc chloride activation of sugar cane bagasse," Journal of Power Sources, Feb. 2010, pp. 912-918, vol. 195, Issue 3, ISSN: 0378-7753.

*Primary Examiner* — Trevor Love
(74) *Attorney, Agent, or Firm* — Patent Portfolio Builders PLLC

(57) ABSTRACT

Disclosed is an anti-algal agent to inhibit algal growth on articles treated with the anti-algal agent. Initially, a Supramolecular Macrocyclic Inorganic Polymer (SMIP) having multiple voids is derived. The voids are in a crystal structure of the SMIP. The SMIP is derived from a metallic element having a multiple valance. The metallic element may have a differential polarity, a hydrogen bonding ability, and an imbalanced electronic orbital energy disposition. Further, a Technical Grade Active Ingredient (TGAI) may be infused in the voids of the SMIP to obtain an anti-algal agent. The anti-algal agent may act as at least one of a biocides or as a preservative to inhibit algal growth on the articles treated. Furthermore, the anti-algal agent when used for treating on properties of treated articles may avoid deterioration of the article from microbial attacks.

6 Claims, No Drawings

ANTI-ALGAL AGENT

CROSS REFERENCE TO RELATED APPLICATIONS AND PRIORITY

The present application is a National Stage of PCT/IN2019/050550, filed on 26 Jul. 2019, which claims priority from Indian Patent Application number 201821030232, filed on 10 Aug. 2018, the complete disclosures of which in their entirety are herein incorporated by reference.

TECHNICAL FIELD

The present invention in general relates to anti-microbial formulations. More particularly, the disclosure relates to anti-algal formulations, their use and methods of preparing them to inhibit algal growth on articles treated with an anti-algal agent.

BACKGROUND

It is observed that a coating on an article such as a paint film is often exposed to an environment which facilitates growth of microorganisms like algae and fungi. Thus, protecting the paint film becomes a paramount task in order to prevent deterioration of a film of a paint by microbial growth occurring on the film. Conventionally, antimicrobial agents like Diuron is being used in formulations as a preservative to protect paint film or any such surface from unwanted algal growth occurring on such surfaces. Diuron has thus become a crucially placed anti-microbial agent for the user industry like paints. However, Diuron may not be available to sufficiently cater to the needs of the growing paint industry. Hence, it has become essential to use Diuron minimally by following certain techniques to formulate the corresponding preservative to be used so as to get better performance and efficacy.

SUMMARY

Before the present method is described, it is to be understood that this application is not limited to the particular methodologies described, as there can be multiple possible embodiments which are not expressly illustrated in the present disclosures. It is also to be understood that the terminology used in the description is for the purpose of describing the particular implementations or experimentations or versions or embodiments only and is not intended to limit the scope of the present application. This summary is provided to introduce aspects related to a method for formulating an anti-algal agent to inhibit algal growth on articles treated with the anti-algal agent. This summary is not intended to identify essential features of the claimed subject matter, nor is it intended for use in determining or limiting the scope of the claimed subject matter.

In one embodiment, an anti-algal agent to inhibit algal growth on articles treated with the anti-algal agent is disclosed. In order to formulate the anti-algal agent, initially, a Supramolecular Macrocyclic Inorganic Polymer (SMIP) having multiple voids in crystal structure may be derived. The voids may be larger in size in the crystal structure of the SMIP. It is to be noted that the SMIP may be derived from a metallic element having a multiple valance, a differential polarity, a hydrogen bonding ability, and additionally an imbalanced electronic orbital energy disposition. Post obtaining the SMIP, an organic compound may be infused in the voids of the SMIP to obtain an anti-algal agent. The organic compound may be a Technical Grade Active Ingredient (TGAI). The anti-algal agent may act as at least one of biocides or as a preservative to inhibit algal growth on the articles treated with the anti-algal agent.

In another embodiment, a composition of an anti-algal agent is disclosed. The anti-algal agent may comprise a Supramolecular Macrocyclic Inorganic Polymer (SMIP) having multiple voids in a crystal structure of the polymer. Further, the anti-algal agent may comprise an organic Technical Grade Active Ingredient (TGAI) compound infused in the voids of the SMIP. It may be noted that the SMIP is derived from a metallic element having a multiple valance. Further, the metallic element may have a differential polarity, a hydrogen bonding ability, and an imbalanced electronic orbital energy disposition.

DETAILED DESCRIPTION

Some embodiments of this disclosure, illustrating all its features, are hereby discussed in detail. The words "deriving," and "infusing," and other forms thereof, are intended to be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any methods similar or equivalent to those described herein can be used in the experiments or trials or testing of embodiments of the present disclosure, the exemplary, methods are now described. The disclosed embodiments are merely examples of the disclosure, which may be embodied in various forms. Various modifications to the embodiment will be readily apparent to those skilled in the art and the generic principles herein may be applied to other embodiments. However, one of ordinary skill in the art will readily recognize that the present disclosure is not intended to be limited to the embodiments described but is to be accorded the widest scope consistent with the principles and features described herein.

The present disclosure provides an anti-algal agent to inhibit algal growth on articles treated with the anti-algal agent. The anti-algal agent may comprise a Supramolecular Macrocyclic Inorganic Polymer (SMIP) having multiple voids in a crystal structure of the polymer. Further, the anti-algal agent may comprise an organic Technical Grade Active Ingredient (TGAI) compound infused in the voids of the SMIP. It may be noted that the SMIP is derived from a metallic element having a multiple valance. Further, the metallic element may have a differential polarity, a hydrogen bonding ability, and an imbalanced electronic orbital energy disposition.

The anti-algal agent is to be added in paints or coating media, thus, to be used for treating articles like paint and such coating media. It is important to note that the anti-algal agent may be chemically non-reactant to composition-compounds of paints or coating media. Further, it is observed that organic compounds like Technical Grade Active Ingredient (TGAI) exhibit anti-microbial properties. The present disclosure mentions about the inclusion of the TGAI into the voids of a stereochemically-oriented SMIP. Further, in one embodiment, one or more TGAI molecular components may self-assemble in the SMIP structure by a process carried out as described below.

In one example, siloxanes may be used as the SMIP. The siloxanes are known for cyclic rings and the voids existing in the ring. A Polydimethyl Siloxane (PDMS) thus may become the fundamental choice for including TGAIs in the voids of the PDMS. While certain aspects of described method for formulating an anti-algal agent to inhibit algal growth on articles treated with the anti-algal agent are explained and experimented in any number of different concentrations, conditions, environments, and/or configurations, the embodiments are described in the context of the following exemplary methodology.

In one embodiment, a method to formulate an anti-algal agent is disclosed. In order to formulate the anti-algal agent, initially, a Supramolecular Macrocyclic Inorganic Polymer (SMIP) having multiple voids in structural disposition of SMIP may be derived. It is to be noted that the SMIP may be derived from a metallic element exhibiting a multiple valance. The metallic element may exhibit a differential polarity, a hydrogen bonding ability, and an imbalanced electronic orbital energy disposition. Example of the metallic element may include, but not limited to, Zinc or metallic elements from lanthanide series. The lanthanide series comprises 14 elements with atomic numbers 58 through 71.

In an embodiment, Zinc Chloride has an element Zinc, wherein Zinc exhibits properties of the metallic element. The Zinc in the Zinc Chloride compound tends to exhibit multiple valance. The SMIP may be derived from the Zinc Chloride when reacted with an oxygenated organic compound having C1 or C1-C2 or C2-C3 or C1-C3 hydroxyl groups in at least one of alcohols, glycols, glucoses, celluloses, and cyclodextrins, and the like. In another embodiment, lanthanide halides may have the metallic element having the multiple valance. The SMIP may be derived from the lanthanide halides when reacted with an oxygenated organic compound having C1 or C1-C2 or C2-C3 or C1-C3 hydroxyl groups comprising alcohols, glycols, glucoses, celluloses, cyclodextrins, and the like.

It must be noted that the SMIP may have a dynamic crystal structure. The dynamic crystal structure may undergo several changes to achieve self-stability under the conditions faced by the SMIP such as temperature and other energy-forces. The crystal structure of the SMIP may have multiple voids of different nature. To elaborate, the SMIP may have certain crystallographic disposition, in which chemical moiety is physically absent or voids are generated in the crystal lattices/structure. The voids may arise on account of repulsions getting initiated due to opposing stereochemical forces. The repulsions may bring in spatial adjustments in the SMIP in order to achieve stability by minimizing an imbalanced energy.

In one embodiment, at least one organic compound may be infused or included or encapsulated in the voids of the SMIP to obtain an anti-algal agent. The organic compound may be one of the TGAIs. In order to infuse the organic compound into the voids of the SMIP, the organic compound needs to have certain polarity characteristics to match up with centers of differential polarity in the SMIP. In other embodiment, the hydrogen bonding ability of the organic compound may also be matched up with the hydrogen bonding ability of the SMIP. Further, it has been accepted that supramolecular interactions may occur from any combination of intermolecular forces, ranging from weak hydrogen-bonding (H-B) to relatively strong metal ion coordination bond as may be perceived to be operative due to disposition of an electronic configuration of a metal ion in the complex and stereochemical effects. It is to be noted that the above-mentioned approaches may allow the inclusion of the organic compound without changing the original organic compound into another distinctive organic compound.

Example of the TGAI includes at least one of Diuron, Octyl Isothiazolinone (OIT), Iodopropynyl Butylcarbamate (IPBC), 2-2-Dibromo-3-nitrilopropionamide (DBNPA), Benzisothiazolinone (BIT), and Bronopol. It is to be noted that the TGAI content may be less than 20% w/w in a modified SMIP obtained as the anti-algal agent. In one example, the TGAI content may be in the range of 12-18% w/w in the modified SMIP as the anti-algal agent.

In one embodiment, the infusion of the TGAI into the voids of the SMIP may be an exothermic reaction at the temperature range of 65 degree C. to 120-degree C. The period of infusion may be about 2 hours or more. In another embodiment, the SMIP may be infused with a second TGAI in another void of the SMIP. In yet another embodiment, the anti-algal agent may be obtained by infusing simultaneously a combination of two or more TGAIs in the voids of the SMIP.

In other embodiment, the process of infusion may be called as an encapsulation, since the SMIP is used as a wrapping medium for an active antimicrobial ingredient (TGAI), finally becoming as the anti-algal agent in the form of a dispersion in an aqueous phase. In yet another embodiment, the encapsulation may be termed as a "polyencapsulation" as multiple TGAIs are encapsulated, either singularly or simultaneously in the SMIP to become the products for enhancing or developing an anti-algal behavior of a treated article so as to protect the treated article from microbial deterioration. Example of the product may include, but not limited to, aqueous dispersions of the enclosed TGAIs in the SMIP. Further, the product is to be dosed in paints or similar medium to become the treated articles. The anti-algal agent may be used only for the self-preservation of the treated articles such as paints or coating media from the algal growth in dry state as a film.

The organic compound called as the TGAI when added in paints or coating media may be devoid of anti-algal properties displayed in a dry state obtained. The dry state of the film may also be observed when the paint like protective coating gets dried on usage. It is to be noted that the anti-algal agent is required to be obtained in the compatible form like an aqueous dispersion and colour neutral to allow the usage in paint or coating medium. Further, the anti-algal agent derived from the SMIP may be used for treating such articles to avoid deterioration of the articles from microbial or algal attacks. Furthermore, the anti-algal agent may act as at least one of a biocides or as a preservative to inhibit algal growth on the dry state of the treated articles. Example of the articles requiring such treatment may include paints for exterior walls of building, paints for super-structure of ships, coating medium for wooden frames and structures, the coating medium for industrial cloth used in tents, tarpaulins, fabric for sportswear, curtains and the like.

In order to elucidate further, consider Zinc as a metallic element having an electronic configuration with filled 3d and 4s orbitals. It is to be noted that despite of the filled 3d and 4s orbitals Zinc acts like an alkaline earth metal. Zinc exhibits co-ordination number four unlike transition metals which hold co-ordination number six. Thus, Zinc is capable to build many co-ordination complexes. In the coordination complexes, Zinc (II) may adopt several coordination geometries, commonly octahedral, tetrahedral, and penta-coordinate geometries. In other examples, Zinc may exhibit tetrahedral coordination geometry in a solid state or octahedral coordination geometry in a solution state. The structural flexibility may be attributed to Zinc's electronic configuration $3d^{10}\ 4s^2$. The 3d orbital is filled, therefore, ligand field effects are nonexistent. The coordination geometry is observed in solid state and hence crystal-structure of the compounds derived from zinc salts having inorganic polymer like status is determined largely by electrostatic and steric interactions. The electrostatic and steric interactions may create voids in the crystals of the zinc salts (may also referred as zinc complexes).

It is important to note that a crystalline nature of Zinc complexes having multiple voids may be selected for doing the inclusion of another organic compound. The organic compound may be a Technical Grade Active Ingredient (TGAI). In the present subject matter, the co-ordination complex of organozinc compounds having pi bond to Zinc via other heteroatom/compound may be used by preference over any other compounds.

Further, Zinc oxide is often used in paints as one ingredient. It is important to note that the Zinc oxide may be made to form a complex co-ordination polymer of Zinc. The complex Zinc polymer may be formed when the Zinc compound is reacted in situ with other functional ingredients including neutral ingredients. The neutral ingredients may be typically present in many paint formulations. Example of the neutral ingredients comprise at least one of C1 or C1-C2 or C2-C3 or C1-C3 hydroxyl groups of alcohols, glycols or glucosides or methyl glucopyranoside. During reaction carried out, Zinc ion may form loose complexes with the neutral ingredients. Thus, the Zinc ion forms complexes with the hemiacetal oxygen atom of the anhydroglucose at a non-reducing end and a hydroxyl group of an anhydroglucose unit at the reducing end. The reaction with hydroxylated solvents, like alcohols and glycols, involves a nucleophilic substitution reaction resulting in the formation of chloroalkanes derivative. The Cl⁻ is not a good nucleophile and in alcoholic solvents acts as a poor leaving group, the final reaction is shown as:

$$R\text{—}OH + ZnCl_2 \rightarrow R[ZnCl_2(OH)] + \text{By Product}$$

The reaction thus results in formation of a complex polymeric compound depending on R moiety and represented as $R^+[ZnCl_2(OH)]^-$.

Experiments and Results

In order to explain the formation of the anti-algal agent in more detail, consider below experiment performed with the Zinc salts as an exemplary embodiment in accordance with the present subject matter. The Zinc salts are primary basic substances found to be the most suited for performing intended reactions towards the formation of the SMIP. It is to be noted that Zinc atom from the Zinc salts forms covalent bonds or co-ordination bond when the reaction of the Zinc salts is suitably carried out with a hydroxyl-containing organic compound. Example of the Zinc salts may include, but not limited to Zinc Chloride, Zinc Oxide and Zinc Nitrate. In an experiment, one or more Zinc salts may also be used in the chemical reaction. The Zinc Chloride may be preferred as a major constituent of the Zinc salts varying from 50% to 70% in ratio or entirely as 100%. The Zinc Chloride is well known to give multiple dispositions of the polymeric structure formed during reaction with hydroxyl derivatives of the organic compounds. The Zinc Chloride may work well when used as anhydrous powder for formation of the complex is reacted with the hydroxyl-derivative of an organic compound.

Further, the chosen hydroxyl-compounds reacting with the Zinc salts may be from any of the primary alcohols such as ethyl alcohol, isopropyl alcohol, n-butanol, iso-butanol, and the like, or their combinations, or glycols such as ethylene glycol, propylene glycol and others, or from any of the complex compounds having multiple hydroxyl functional group such as glucosides, celluloses, dextrin, cyclodextrins and the like.

It must be noted that primary alcohols may be used in molar excess with the molar ratios in the range of 1:1.2 to 1:2.5 with respect to the Zinc salt. In one aspect, the molar ratio may be varied from 1:0.8 to 1:1.5 when glycols are used. In another aspect, the molar ratio of the reacting mass may be ranging from 1:0.5 to 1:0.4 when at least one of the dextrin, the cyclodextrins or any other multi-hydroxyl compounds may be used to derive the Zinc complex. In yet another aspect, the molar ratio may be varied as per combination ratio of the Zinc salts, from Zinc Oxide to Zinc nitrate is used when the multi-hydroxyl compounds may be reacted.

Further, the molar ratio may be decided based on further handling of the reaction mass to perform the inclusion activity in a homogeneity of the reaction medium. In one example, a comparatively more water-soluble Zinc complex as SMIP may be formed when at least one of the hydroxyl-compounds is from glucosides, dextrin, the cyclodextrin and the glycols. In another example, Zinc complexes as the SMIP may still be formed only in presence of the glycols also acting as solvent.

The initial reaction temperature may be in the range of 65 degree C. to 120 degree over the period of about 2-3 hours. The temperature of reaction may vary as per nature of the hydroxylated reactant. The period may be lees when the hydroxylated reactants are sufficiently active. The hydroxylated reactants may include, but not limited to, alcohols and glycols. In an example, the reaction temperature may be maintained in the range of 75-85-degree C. for about 1.5 hours. Under uncontrolled reaction temperature and time, the SMIP may not form in quantum as expected but some by-products may form in proportion. The estimation of the degree of such formations may not be possible during the course of the reaction. The chemical mass may be obtained once at least one of the TGAI is added in the SMIP and allowed to interact with the SMIP. It must be noted that the SMIP is present in situ state to give desired mass of chemical composition having altogether different anti-microbial activity once the TGAI is added and allowed to interact.

Further, it is to be noted that the Zinc complex may be in a transient state of stability during the formation of the co-ordination bonds. Further, the Zinc complex is formed from weak co-ordination bonds which may break by just sufficient excess of energy present in reaction environment. Hence, the excess of energy present in the reaction environment needs to be controlled. Therefore, the infusion may need a thermodynamic control on energy status. Further, it is observed that the increase in reaction time by keeping constant temperature have not given the desired results. The excessive energy may be seen from the sudden rise in temperature of the reaction mass from a gradual state just prior to it denoted by temperature-range from 55 degree C. to 80 Degree C. The gradual state of reaction status may vary as per each set of reactants used to form the SMIP. The formation of the SMIP may be decided by large number of empirical studies performed, but it is certainly not a vague feature of the present embodiment.

Isolation of the Zinc complex as the SMIP from the reaction mass may be carried out at lower temperature by concentrating the reaction mass at lower temp to remove volatiles. The volatiles may be removed by lowering the reaction-pressure. Thus, it has been observed that the reaction needs the energy and also the thermodynamic control on the energy. The isolation of the reaction mass containing the SMIP may not be necessary. Therefore, in the reaction mass direct addition of the organic compound, for example the TGAI, may be carried out. The point of addition of the TGAI may be determined empirically for each type of a set of combination of reactants.

Further, in the solution stage of the SMIP or in situ state, the TGAI may be doped into the SMIP. The quantum of such doping may vary from 12% to 20%. The quantum lower than 12% does not apparently indicate having obtained sufficiently good results as determined by anti-microbial property, and specifically anti-algal property of the reaction mass by dosage-usage for application in paints to preserve the dry film of paint from algal growth and on noting the said property before and after such dosing. It may be noted that an attempted inclusion of the quantum of the TGAI higher than 20% may not be feasible. The part of the TGAI when used in proportion higher than 20% may remain only as an associated chemical in the reaction mass.

Further, it becomes necessary to identify whether the TGAI has reacted to form any other compound having the anti-algal characteristics instead of undergoing the inclusion in the SMIP and whether such inclusion complex has been showing anti-algal characteristics. Chromatography is used in Chemical Science to identify the presence of an organic compound in the system against the organic compound used. When there is different chemical in the system, the detection point of the organic compound differs in chromatographic run. The studies carried out by High Performance Liquid Chromatography (HPLC) analysis indicated the unchanged nature of the TGAI in the end-product. The TGAI in the SMIP got detected at the same retention time by the identical method of analysis using the HPLC analysis against the injected original TGAI. Thus, indicating the presence of TGAI in the SMIP with retention of original characteristics. Therefore, the TGAI not having changed chemically, not even forming any salt in some quantum, when 12 to 20% quantum inclusion of TGAI was attempted in the SMIP.

The formation of a different compound of the TGAI in the SMIP needs a different method of analysis for identifying the organic compound by the HPLC analysis against the injected original organic compound. The quantum of the TGAI in the SMIP also co-related to the initial quantum added for doing the inclusion in the SMIP. But the resultant mass having led to different anti-microbial property, particularly anti-algal property which is not exhibited by the original TGAI in the dry film state, may indicate that extra characteristics having been derived from the inclusion complex of the SMIP from the TGAI. Each set of reactants to form the SMIP and with each TGAI may give differential anti-algal properties to preserve the dry film of paint or coating from algal growth and on noting the property before and after such dosing as was noted by empirical studies done.

The absence of chemical change in the TGAI may indicate the TGAI in each case may have been well-included in the voids of the stereochemically oriented polymeric structure of the SMIP. The TGAI so included in the SMIP has exhibited entirely differentiating and pronounced anti-algal property as that of the reaction mass in each set of reactants. The SMIP may be typically shown as C1-C2 Oxy-Zinc Chloride Polymer. Example of the TGAI includes at least one of Diuron, Octyl Isothiazolinone (OIT), Iodopropynyl Butylcarbamate (IPBC), 2-2-Dibromo-3-nitrilopropionamide (DBNPA), Benzisothiazolinone (BIT), and Bronopol. The degree of inclusion may be different. In one embodiment, the TGAI may be doped in the stereochemically oriented polymeric structure of SMIP at a reaction temperature of 50 to 80 degree C. over the duration of 2 to 6 hours. Further, the temperature may be just around 60 degree C. A concentration of the content of the TGAI may be in the range of 12-20% w/w with respect to the reaction mass of the SMIP as the complex in either of the alcoholic solution or the glycolic solution as medium having added water. Furthermore, the reaction mass may be cooled to obtain a clear viscous semi-solid substance as crystals. The crystals may be having distinct difference from the crystalline nature of the TGAI.

In one example, when Diuron is used as the TGAI, a slurry with a granular composition may be obtained. It is observed that the presence of Diuron may be identified from the granular composition indicating Diuron having not changed to any other chemical substance but being present in the SMIP. The anti-algal properties may have remained identical as experimental working may show. In an experiment when the BIT may be used as TGAI for the inclusion, a long needle like crystalline solid may be obtained. It may be observed that BIT is identifiable from the crystal and not being present in any other chemical form. Upon analysis of the reaction mass it may be evident that the BIT has not gone any chemical change but the reaction mass having acquired prominently noticeable newer anti-algal properties. In another experiment, when the OIT is used as the TGAI, the reaction mass like a thick pasty substance having not so pronounced anti-algal properties beyond what OIT may show may be obtained, as the comparative microbiology studies showed by the ASTM Method 5589/90.

Further, in yet another experiment when the SMIP is based on the cyclodextrin, the physical appearance of the compounds may be changed. Furthermore, each appearance may also differ when different cyclodextrins are used to form the SMIP with Zinc compound in order to derive the anti-algal agent. Those compounds may not show the pronounced anti-algal properties on the dry film.

In yet another experiment, with BIT used as the TGAI at 3-11% inclusion, a pasty composition may be obtained when the beta-cyclodextrin is used to form the SMIP with the zinc compound and the inclusion attempted to derive the anti-algal agent. The end pasty compound may show anti-algal property on the dry film.

In yet another experiment, with the IPBC as the TGAI for inclusion at 4 to 12%, a translucent composition may be obtained when the beta-cyclodextrin is used for the formation of the SMIP with the zinc compound to obtain the anti-algal agent. However, the end-compound may not show pronounced anti-algal property on the dry film.

In yet another experiment, with Bronopol used as the TGAI for inclusion at 6 to 14%, a complex substance may be obtained when any of cyclodextrin is used for the formation of the SMIP with the zinc compound to derive the anti-algal compound. However, the end compound may not show anti-algal property on the dry film.

It is to be noted that each of the above anti-algal compounds derived in solid form may be converted into aqueous dispersions which need to be compatible with paints or coating media. The aqueous dispersions may be carried out using known dispersing agents, coalescing agents, and neutral fillers as extenders for getting certain body for the dispersions. Example of the neutral extenders are Zinc Oxide, Talc, China Clay, Silica and alike. In one experiment, the percentage of the neutral fillers may vary from 20 to 45% w/w of the reaction mass. The active content of the aqueous dispersion may be maintained between 4 to 20% w/w of the reaction mass.

The anti-algal agent may be further worked out to form a stable aqueous dispersion over longer storage period by adding inert materials and adjuvants. Further, stability of the anti-algal agent may be achieved by using certain glycols. The aqueous dispersion when added in paints or in similar surface coating materials may exhibit unusual and least expected newer antimicrobial activities even at low dosage of the dispersion as an anti-algal agent when screened against a few species of algae, fungi and bacteria.

It may be understood that an anti-algal agent may be formulated by using lanthanide halides as an inorganic supramolecular complex polymer along with the TGAI. Exemplary embodiments discussed above may provide certain advantages. Though not required to practice aspects of the disclosure, these advantages may include those provided by the following features.

Some embodiments of the present invention facilitate inclusion of Diuron in a Supramolecular Macrocyclic Inorganic Polymer (SMIP) suitable for treating an article.

Some embodiments of the present invention facilitate selecting different TGAIs individually or in combination for inclusion in the SMIP.

Some embodiments of the present invention ensure that each of SMIP and TGAI do not form another compound by way of any chemical reaction.

Some embodiments of the present invention facilitate commercial feasibility for including an antimicrobial agent in varnishes, paints, and other coating materials to protect the article.

Some embodiments of the present invention provide long term stability and other reproducible properties of the anti-algal agent included organic compound.

Some embodiments of the present invention provide extensive performance characteristics of the anti-algal agent by conducting further microbial probing to establish a bio-efficiency of the anti-algal agent.

Some embodiments of the present invention enhance the performance of a conventional Diuron formulation as anti-algal preservative.

Some embodiments of the present invention facilitate study of toxicity related safety issues for the resultant material to allow commercialization of the anti-algal agent.

Exemplary embodiments discussed above may provide certain advantages. Though not required to practice aspects of the disclosure, these advantages may include for formulating an anti-algal agent to inhibit algal growth on articles treated with the anti-algal agent. Although experimentations for methods for formulating an anti-algal agent to inhibit algal growth on articles treated with the anti-algal agent have been described in language specific to structural features and/or methods, it is to be understood that the appended claims are not necessarily limited to the specific features or methods described.

We claim:

1. A method to formulate an anti-algal agent to inhibit algal growth on articles treated with the anti-algal agent, the method comprising:

deriving a Supramolecular Macrocyclic Inorganic Polymer (SMIP) having multiple voids, wherein the voids are in a crystal structure of the SMIP, wherein the SMIP is derived from a metallic element having a multiple valance, and wherein the metallic element has a differential polarity, a hydrogen bonding ability, and an imbalanced electronic orbital energy disposition; and infusing an organic compound in the voids of the SMIP, wherein the organic compound is a technical grade active ingredient (TGAI) to obtain an anti-algal agent, wherein the anti-algal agent acts as at least one of a biocide or as a preservative to inhibit algal growth on the articles treated, wherein the SMIP is derived from Zinc Chloride when reacted with an oxygenated organic compound having C2 or C3 hydroxyl groups comprising glycols, alcohols, celluloses, and cyclodextrins, and wherein the Zinc Chloride has the metallic element, and wherein the TGAI is at least one of Octyl Isothiazolinone (OIT), Iodopropynyl Butylcarbamate (IPBC), 2-2-Dibromo-3-nitrilopropionamide (DBNPA), Benzisothiazolinone (BIT), Bronopol, and wherein the TGAI is less than 20% w/w in the anti-algal agent.

2. The method of claim 1, further comprising infusing a second organic compound in the voids of the SMIP.

3. The method of claim 1, wherein the organic compound is devoid of anti-algal properties in a dry state including a dry film on the treated article.

4. The method of claim 1, wherein the anti-algal agent is an aqueous dispersion.

5. The method of claim 1, wherein the anti-algal agent is colour neutral.

6. An anti-algal agent comprising:

a Suprarmolecular Macrocyclic Inorganic Polymer (SMIP) having multiple voids in a crystal structure of the polymer; and an organic Technical Grade Active Ingredient (TGAI) compound infused in the voids of the SMIP, wherein the SMIP is derived tram a metallic element having a multiple valance, and wherein the metallic element has a differential polarity, a hydrogen bonding ability, and an imbalanced electronic orbital energy disposition, wherein the SMIP is derived tram Zinc Chloride when reacted with an oxygenated organic compound having C2 or C3 hydroxyl groups comprising glycols, alcohols, celluloses, and cyclodextrins, and wherein the Zinc Chloride has the metallic element, and wherein the TGAI is at least one of Octyl Isothiazolinone (OIT), Iodopropynyl Butylcarbamate (IPBC), 2-2-Dibromo-3-nitrilopropionamide (DBNPA), Benzisothiazolinone (BIT), Bronopol, and wherein the TGAI is less than 20% w/w in the anti-algal agent.

* * * * *